Dec. 8, 1925.

S. JENCICK

FLEXIBLE COUPLING

Filed April 29, 1920

1,565,011

INVENTOR
Stephen Jencick
BY Brockett & Hyde
ATTORNEYS

Patented Dec. 8, 1925.

1,565,011

UNITED STATES PATENT OFFICE.

STEPHEN JENCICK, OF CLEVELAND, OHIO, ASSIGNOR TO GUSTAVUS A. SCHANZE, OF CLEVELAND, OHIO; P. L. SCHANZE ADMINISTRATOR OF SAID G. A. SCHANZE, DECEASED.

FLEXIBLE COUPLING.

Application filed April 29, 1920. Serial No. 377,624.

*To all whom it may concern:*

Be it known that I, STEPHEN JENCICK, a citizen or subject of the Government of Austria, residing at Cleveland, in the county of Cuyahoga and State of Ohio, have invented certain new and useful Improvements in Flexible Couplings, of which the following is a specification.

This invention relates to flexible couplings, such as are used for connecting aligned shaft sections, especially when some flexibility or freedom of movement between such shaft members is required.

The invention is an improvement upon or modification of the invention described in my companion application Serial Number 377,623 for flexible couplings, filed of even date herewith.

The present invention relates to that class of flexible couplings embodying a flexible disc having a central opening, the edge of said opening and the periphery of the disc being respectively connected to the two shaft sections.

The object of the invention is to improve the connection between the two shaft sections and the inner and outer edges of the disc to thereby materially increase the strength of the coupling without loss of flexibility and without material increase in cost.

Further objects of the invention are in part obvious and in part will appear more in detail hereinafter.

Figure 1:
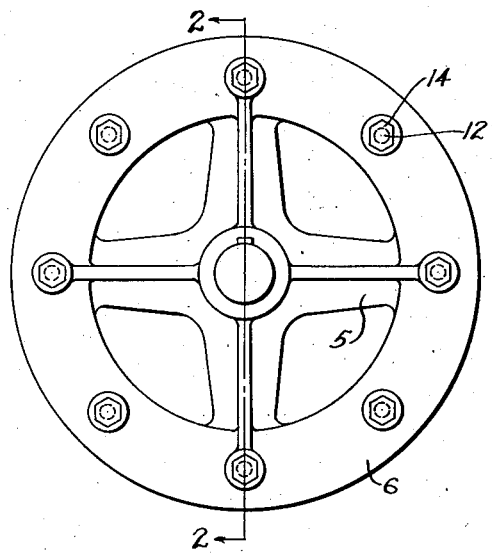
Figure 2:
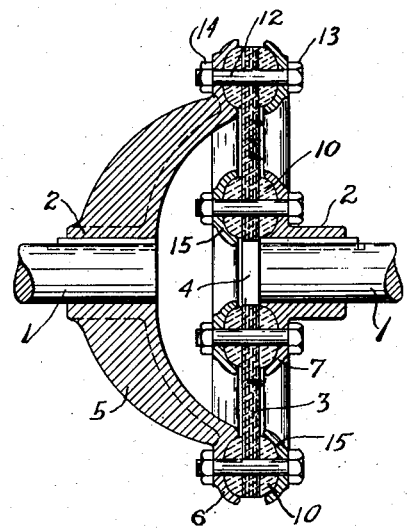
Figure 3:
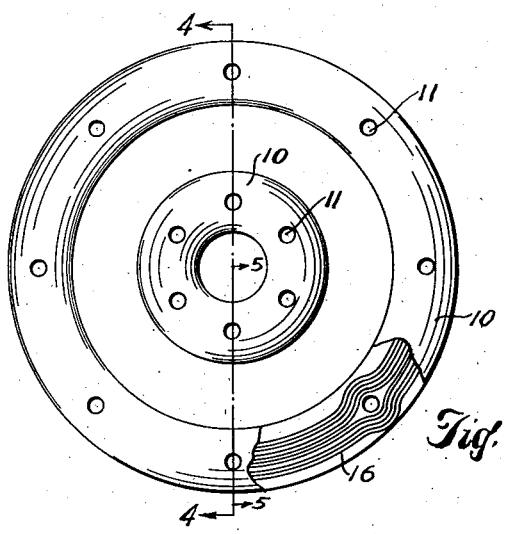
Figure 4:
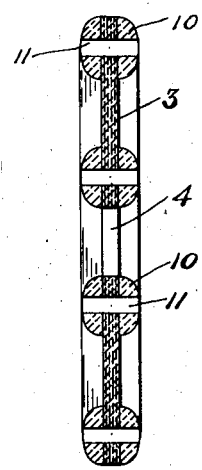
Figure 5:
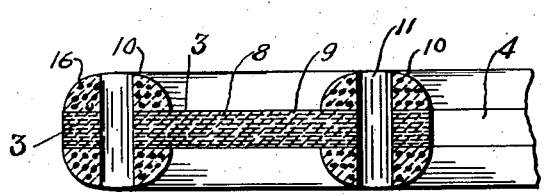

In the drawings, which represent one embodiment of the invention, Fig. 1 is an end view; Fig. 2 is a sectional elevation, on the line 2—2, Fig. 1; Fig. 3 is an end view of the central coupling disc; Fig. 4 is a section on the line 4—4, Fig. 3; and Fig. 5 is an enlarged detail section on the line 5—5, Fig. 3.

In the drawings, the two shaft members to be connected are indicated at 1. Each of said shaft members has connected thereto a sleeve or other coupling frame member 2. Said coupling members 2 are connected by a disc 3 which lies between the shaft sections in a plane transverse thereto and is provided with a central opening 4. One of the members 2, such as the one at the left in Fig. 2, is connected to the outer edge or periphery of the disc 3, while the other member 2 at the right is connected to the edge of opening 4. The left hand member 2 is therefore provided with arm portions 5 connected at their outer ends by a ring 6, while the right hand member 2 is provided with a similar but smaller ring portion 7.

Disc 3 is made up of a series of layers or plies 8 of canvas or other suitable textile fabric embedded in a body 9 of rubber, rubber composition, or like flexible material. The material for said disc is built up in large sheets and the discs are punched out therefrom. In the manufacture of the present coupling said disc, after being punched out, is provided on each face adjacent to both the inner and outer edges with an annular rib or projection 10 of rubber, there being four of such annular ribs in all. These rubber ribs may be applied after the disc is punched out and before it is vulcanized, so that during the vulcanizing operation they become, in effect, an integral part of the disc. At intervals the disc is provided, adjacent its outer periphery and adjacent the edge of the central opening, with a series of openings 11, which pass through the ribs 10. These openings are provided to receive bolts 12, having heads 13 and nuts 14. The ring members 6 and 7 are in the form of trough-shaped annular flanges corresponding in shape with and fitting the ribs 10, and on the opposite side of the disc to each of said flanges the corresponding rib is provided with a trough-shaped ring or annulus 15. These flanges and rings serve to closely embrace and confine the rubber ribs and also serve as washers for the bolts 12.

If desired, each rib may be reenforced by embedding therein strands 16 of cord, such as are used in forming cord tires. These strands pass around the bolt openings and are continuous around the entire circumference. They therefore serve to reenforce the entire structure.

When the device is clamped together the strength is increased very materially, due to the fact that each bolt has an increased bearing surface in the rubber where the strain is most severe. Therefore, the bolts may be made of smaller diameter without loss of strength. At the same time the flexibility of the device has not been diminished and the two shaft sections may be inclined to each other, as is usual.

What I claim is:

1. A coupling member, comprising a flexible disc having a central opening, said disc being provided with reenforcing strands around its periphery.

2. A coupling member, comprising a flexible disc having a central opening, said disc being provided with reenforcing means around its periphery and the edge of said opening.

3. A coupling member, comprising a flexible disc having a central opening, said disc being provided around its periphery and the edge of said opening with reenforcing ribs of flexible material.

4. A coupling member, comprising a flexible disc having a central opening, said disc being provided around its periphery and the edge of said opening with reenforcing ribs of flexible material and reenforcing strands embedded therein.

5. A coupling member, comprising a flexible disc having a central opening, said disc being provided on each face with reenforcing ribs at the edge of said opening and at the periphery.

6. A coupling member, comprising a flexible disc having a central opening, said disc being provided on each face with reenforcing ribs at the edge of said opening and at the periphery, said disc being also provided with bolt openings through its body and through said ribs.

7. A coupling, comprising a disc of flexible material having a central opening and opposing pairs of reenforcing ribs having bolt openings therethrough, frame members adapted for attachment to shaft members, said frame members having channeled ring portions for engaging said ribs, and bolts passing through said ring portions and openings.

In testimony whereof I affix my signature.

STEPHEN JENCICK.